(12) United States Patent
Gustafsson et al.

(10) Patent No.: US 9,363,191 B2
(45) Date of Patent: Jun. 7, 2016

(54) SERVICE ACCESS APPARATUS, METHOD, COMPUTER PROGRAM AND COMPUTER PROGRAM PRODUCT FOR SELECTIVE INITIATION OF COMMUNICATION

(75) Inventors: Martin Gustafsson, Kungsängen (SE); Andreas Ljunggren, Vällingby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 235 days.

(21) Appl. No.: 13/988,777

(22) PCT Filed: Dec. 2, 2010

(86) PCT No.: PCT/SE2010/051334
§ 371 (c)(1),
(2), (4) Date: May 22, 2013

(87) PCT Pub. No.: WO2012/074448
PCT Pub. Date: Jun. 7, 2012

(65) Prior Publication Data
US 2013/0254414 A1    Sep. 26, 2013

(51) Int. Cl.
*G06F 15/16* (2006.01)
*H04L 12/911* (2013.01)
*H04L 29/12* (2006.01)

(52) U.S. Cl.
CPC .......... *H04L 47/70* (2013.01); *H04L 29/12066* (2013.01); *H04L 29/12669* (2013.01); *H04L 29/12896* (2013.01); *H04L 61/1511* (2013.01); *H04L 61/304* (2013.01); *H04L 61/305* (2013.01); *H04L 61/605* (2013.01)

(58) Field of Classification Search
CPC .................................................. H04L 29/12066
USPC .................................................. 709/227, 229
See application file for complete search history.

(56) References Cited

U.S. PATENT DOCUMENTS 8,583,765 B1 *   11/2013   Rachabathuni et al. ...... 709/219
2009/0113074 A1 *   4/2009   Statia et al. ................... 709/245

FOREIGN PATENT DOCUMENTS

WO         2009157831 A1        12/2009

* cited by examiner

*Primary Examiner* — Adnan Mirza
(74) *Attorney, Agent, or Firm* — Patents on Demand, P.A.; Brian K. Buchheit; Scott M. Garrett

(57) ABSTRACT

It is presented a service access apparatus arranged to selectively initiate communication with a network node providing a service. The service access apparatus comprises: a data obtainer arranged to obtain a multilevel hierarchical identifier associated with a user of the service access apparatus and when the multilevel hierarchical identifier does not have a lower level first, reversing the multilevel hierarchical identifier; a concatenator arranged to determine a combined domain name; a domain name lookup client arranged to perform a domain name lookup using the combined domain name, and receiving a response of the domain name lookup; and a communication initiator arranged to, when the response comprises a valid resource record for the network node, initiate communication with the network node using a node pointer in the resource record. A corresponding method, computer program and computer program product are also presented.

12 Claims, 5 Drawing Sheets

SERVICE ACCESS APPARATUS, METHOD, COMPUTER PROGRAM AND COMPUTER PROGRAM PRODUCT FOR SELECTIVE INITIATION OF COMMUNICATION

TECHNICAL FIELD

The invention relates to data communication and more particularly to selectively initiating communication with a network node providing a service.

BACKGROUND

For servers, e.g. connected to the Internet or other IP (Internet Protocol) networks, it is common that a particular server is only set up to serve requests where the requester meets some criteria e.g. of a user or of a geographic location or associated with a particular service provider.

In the prior art, such a server will still be called from invalid requesters who has no control of whether the request can be served or not. The server thus has to examine the request and determine whether to serve the request or not. In other words, even for requests that are not to be served, the server is required to perform a significant amount of processing, particularly if there are many such invalid requests.

It would of great benefit if there was a way to prevent such invalid requests from even reaching such servers.

SUMMARY

It is an object of embodiment herein to reduce traffic when requests are not allowed.

According to a first embodiment, it is presented a service access apparatus arranged to selectively initiate communication with a network node providing a service. The service access apparatus comprises: a data obtainer arranged to obtain a multilevel hierarchical identifier associated with a user of the service access apparatus and when the multilevel hierarchical identifier differs from being structured with a lower level first, reversing the multilevel hierarchical identifier such that the multilevel hierarchical identifier is structured with a lower level first; a concatenator arranged to determine a combined domain name by concatenating the multilevel hierarchical identifier and a domain name of the network node; a domain name lookup client arranged to perform a domain name lookup using the combined domain name, and receiving a response of the domain name lookup; and a communication initiator arranged to, when the response comprises a valid resource record for the network node, initiate communication with the network node using a node pointer in the resource record.

This service access apparatus allows the use of the domain name service (DNS) to control access to the service of the network node. The operator of the service can then supply the DNS with resource records which take into account the multilevel hierarchical identifier associated with the user. In this way, access to the service can be routed or barred depending on the multilevel hierarchical identifier associated with the user. Also, due to the use of the hierarchy of the identifier associated with the user, groups of users can easily be configured to be routed to a particular network node or barred, e.g. using wildcards.

The communication initiator may further be arranged to, when the response fails to comprise a valid resource record for the network node, refrain from initiating communication with the network node. In other words, no request is sent to the network node, which effectively reduces network traffic.

The data obtainer may be arranged to, when the multilevel hierarchical identifier differs from being structured with separators between levels, inserting at least one separator between levels of the multilevel hierarchical identifier. For example, a period '.' can be inserted to ensure compliance with DNS resource record syntax.

The service access apparatus may be arranged to allow remote access by the user and the service access apparatus may act as a server for a user device. For example, the service access apparatus can be comprised in a web server accessed remotely by a user using a web browser.

The data obtainer may be arranged to obtain the multilevel hierarchical identifier being an IP address of the user device and reverse the IP address. The IP address of the user can be one useful way for the operator of the service to control service access, as the IP address often indicates geographic location and internet access provider of the user.

The data obtainer may be arranged to obtain the multilevel hierarchical identifier being a domain part of an e-mail address of the user. The domain part of the e-mail address of the user can be one useful way for the operator of the service to control service access, as the domain can for example indicate an employer or organisation associated with the user.

The data obtainer may be arranged to obtain the multilevel hierarchical identifier being a phone number associated with the user. The phone number of the user can be one useful way for the operator of the service to control service access, as the phone number (particularly land-line numbers) often indicates geographic location.

According to a second embodiment, it is presented a method performed in an service access apparatus to selectively initiate communication with a network node providing a service. The method comprises: obtaining a multilevel hierarchical identifier associated with a user of the service access apparatus; when the multilevel hierarchical identifier differs from being structured with a lower level first, reversing the multilevel hierarchical identifier such that the multilevel hierarchical identifier is structured with a lower level first; concatenating the multilevel hierarchical identifier and a domain name of the network node to provide a combined domain name; performing a domain name lookup using the combined domain name; and receiving a response of the domain name lookup; and when the response comprises a valid resource record for the network node, initiating communication with the network node using a node pointer in the resource record.

The method may further comprise: when the response fails to comprise a valid resource record for the network node, refraining from initiating communication with the network node.

The method may further comprise: when the multilevel hierarchical identifier differs from being structured with separators between levels, inserting at least one separator between levels of the multilevel hierarchical identifier.

According to third embodiment, it is presented a computer program for an service access apparatus, the computer program comprising computer program code which, when run on the service access apparatus, causes the service access apparatus to: obtain a multilevel hierarchical identifier associated with a user of the service access apparatus; when the multilevel hierarchical identifier differs from being structured with a lower level first, reverse the multilevel hierarchical identifier such that the multilevel hierarchical identifier is structured with a lower level first; concatenate the multilevel hierarchical identifier and a domain name of the network node to provide a combined domain name; perform a domain name lookup using the combined domain name; and receive a response of the domain name lookup; and when the response comprises a valid resource record for the network node, initiate communication with the network node using a node pointer in the resource record.

According to a fourth embodiment, it is presented a computer program product comprising a computer program according to the third embodiment and a computer readable means on which the computer program is stored.

It is to be noted that any feature of the first, second, third, and fourth embodiments may, where appropriate, be applied to any other of these embodiments.

Generally, all terms used in the application are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1A:
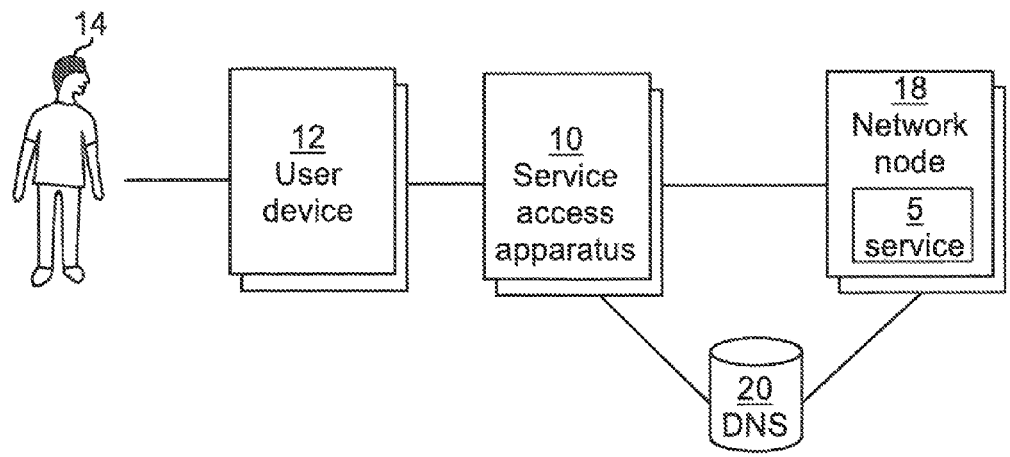
FIGS. 1a and 1b are schematic diagrams showing an overview of environments where embodiments of the invention can be applied.
Figure 1B:
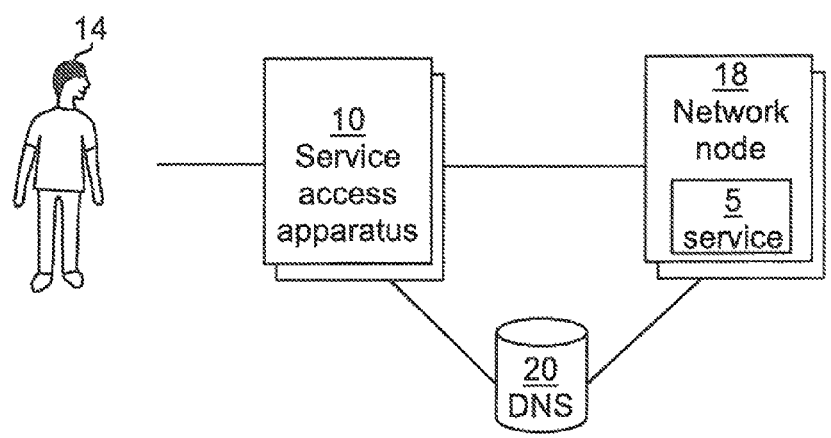

FIGS. 1a and 1b are schematic diagrams showing an overview of environments where embodiments of the invention can be applied. In FIG. 1a, a user 14 is using a user device 12 to access a service access apparatus 10, e.g. over a wide area network such as the Internet. The user device 12 can for example be a desktop computer, laptop computer, mobile (cellular) phone, reading pad, etc, as long as the user device 12 can access the service access apparatus 10 to access some content of use to the user 14. The service access apparatus 10, in turn desires to access a service 5 of a network node 18. To gain access to the network node 18, the service access apparatus 10 performs a name lookup using DNS 20. In the cases that a valid DNS response is returned from the DNS 20 to the service access apparatus 10, the service access apparatus 10 initiates communication with the network node 18 e.g. over a wide area network, such as the Internet, or a local area network. For example, the user 14 can use the user device 12 to access a web site on the service access apparatus 10, which in that case is a web server 10. The web server, in turn, accesses the network node 18 to gain access to a service 5 providing third party information, such as information about the user 14.

As indicated in FIG. 1a, there may be several user devices 12, several service access apparatuses 10 and several network nodes 18, each with a respective service 5.

The network node 18 comprises at least one server being capable of providing the service 5. Optionally, the network node 18 comprises a plurality of servers and is fronted by a load balancer. However, from the perspective of the service access apparatus, even in the load balancer case, the server pointed to by the load balancer is still accessed using the address of the network node 18. In other words, for the service access apparatus 10, the load balancer is transparent.

The DNS 20 is a hierarchy of DNS databases as known in the art. Caching can be provided at one or more levels in the DNS hierarchy. As will be explained in more detail below, entries in the DNS have been adapted to prevent access or route access to the network node 18 prior to the service access apparatus 10 contacting the network node 18.

In FIG. 1b, the user is in direct contact with the service access apparatus 10, which in turn accesses a service 5 on the network node 18. For example, the service access apparatus 10 here can be a smart phone with an installed application performing the methods presented herein.

Figure 2A:
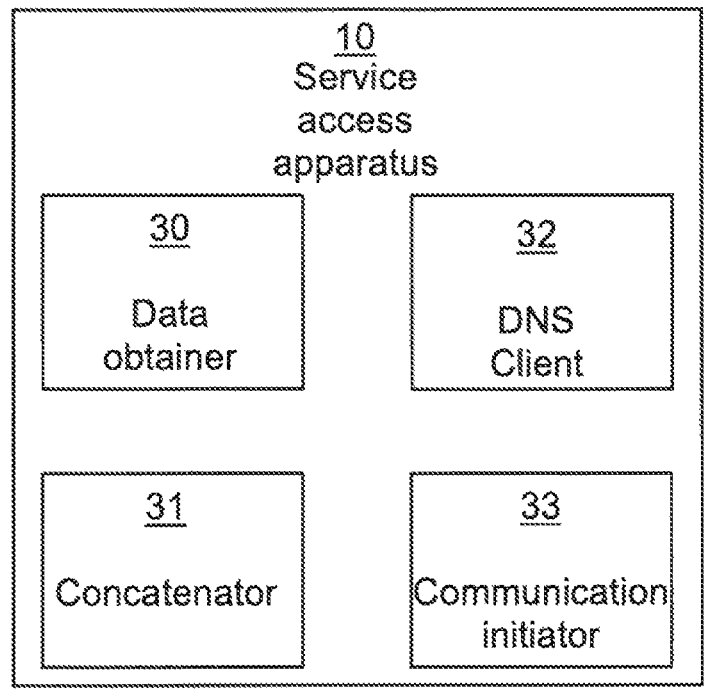
FIG. 2a is a schematic diagram showing functional modules of the service access apparatus of FIGS. 1a and 1b.

FIG. 2a is a schematic diagram showing functional modules of the service access apparatus of FIGS. 1a and 1b. The modules can be implemented using software such as a computer program executing in the service access apparatus 10. All modules depend on an execution environment which utilises a controller 40, a computer program product 42 and an I/O interface 44.

A data obtainer 30 is arranged to obtain a multilevel hierarchical identifier associated with the user 14 of the service access apparatus 10. When the multilevel hierarchical identifier is not structured such that a lower level comes first, the data obtainer reverses the multilevel hierarchical identifier. In that way it is ensured that the multilevel hierarchical identifier is structured with a lower level first. The multilevel hierarchical identifier can for example be a string value. First is to be construed as leftmost in a string.

In a first example, the multilevel hierarchical identifier is an IP (Internet Protocol) address of format "a.b.c.d". Here, "a" is at the highest level, going down through "b" and "c" to "d", which is at the lowest level. In this case, the lowest level is not first, whereby the data obtainer reverses the IP address to provide a multilevel hierarchical identifier of "d.c.b.a".

In a second example, the multilevel hierarchical identifier is a domain name of format "www.foo.com". Here, 'com' is on the highest level, going down through 'foo' to 'www', which is the lowest level. In this case, the lowest level is first, whereby the data obtainer does not need to reverse the domain name, and the multilevel hierarchical identifier is retained as "www.foo.com".

In a third example, the multilevel hierarchical identifier is a phone number of format "+46 8 1234567", where "46" is the country code, "8" is the area code and "1234567" is the phone number within the area code. The plus sign is disregarded. In this way, the phone number has three levels in the multilevel hierarchical identifier in this example. In this situation, "46" is on the highest level, going down through "8" to "1234567", which is the lowest level. In this case, the lowest level is not first, whereby the data obtainer reverses the three levels of the phone number, resulting in a multilevel hierarchical identifier of "1234567 8 46". Alternatively, the phone number is treated digit by digit, whereby "46 8 1234567" is reversed to a multilevel hierarchical identifier of "7654321 8 64".

Optionally, the data obtainer 30 can be arranged to insert separators, such as periods '.' between the levels of the multilevel hierarchical identifier. For example, if the multilevel hierarchical identifier is the reversed phone number of "7654321 8 64", periods can be inserted to provide a multilevel hierarchical identifier of "7654321.8.64".

A concatenator 31 is arranged to determine a combined domain name by concatenating the multilevel hierarchical identifier and a domain name of the network node 18 with the service 5. A separator can be inserted between these two strings. The data obtainer is responsible for reversing the multilevel hierarchical identifier when it is structured such that the highest level comes first. In this way, the combined domain name is in a strict order from lower level (more detailed level) to a higher level (more general level).

A DNS client 32 is arranged to perform a domain name lookup using the combined domain name, and receiving a response of the domain name lookup. The lookup is performed using the DNS 20.

A communication initiator 33 is arranged to, when the response of the domain name lookup comprises a valid resource record for the network node 18, initiate communication with the network node 18 using a node pointer in the resource record. The resource record can refer to another domain name such as in a CNAME record or an IP address such as in an A record. In the case the response is another domain name, another DNS lookup would be performed (potentially recursively) until an IP address is found or a response with no valid node is received.

If a response does not contain a valid resource record for the network node 18, the communication initiator never initiates communication with the network node 18. In fact, since no valid pointer to the network node 18 was received in this case, the service access apparatus is even unable to initiate communication with the network node 18. A no match response is interpreted as no valid record. Another example of a pointer in an invalid resource record can be a particular response which in advance, by the network node and the service access apparatus, has been agreed to represent an invalid response, e.g. an IP address of '127.0.0.2'.

Figure 2B:
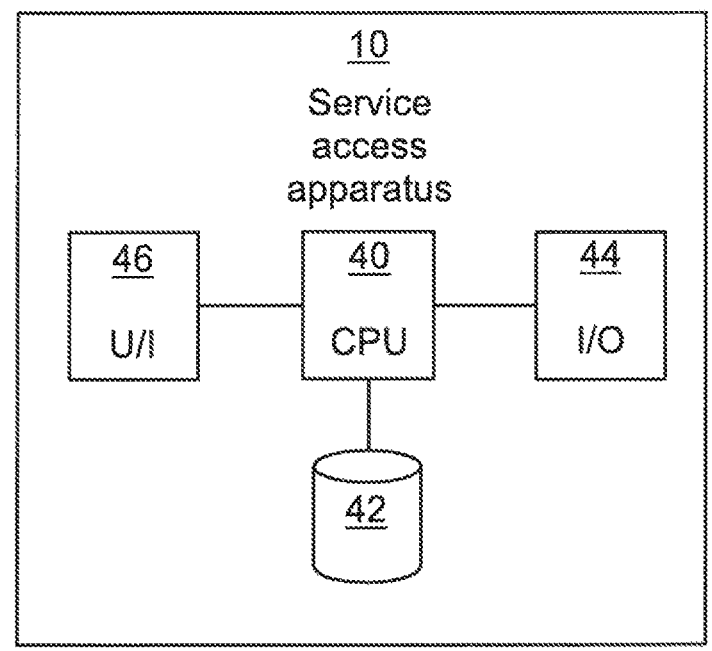
FIG. 2b is a schematic diagram of components of the service access apparatus FIGS. 1a and 1b.

FIG. 2b is a schematic diagram of components of the service access apparatus 10, of FIGS. 1a and 1b.

A controller 40 is provided using any suitable central processing unit (CPU), microcontroller, digital signal processor (DSP), etc., capable of executing software instructions stored in a computer readable media 42, e.g., memory. The computer readable media 42 can be any combination of read and write memory (RAM) and read only memory (ROM). The computer readable media 42 also comprises persistent storage, which, for example, can be any single one or combination of magnetic memory, optical memory, or solid state memory.

An input/output interface 44 is provided to allow the service access apparatus 10 to communicate with other network nodes as shown in FIGS. 1a and 1b, e.g. using the Internet, and/or a mobile (cellular) network.

A user interface 46 is optionally provided to allow the user 14 to interact with the service access apparatus 10. In particular, in the embodiment of FIG. 1a, the user interface 46 is typically provided. The user interface 46 can include a display and an input device such as a touch function of the display and/or physical buttons and/or positional input such as a mouse, trackball, etc.

Figure 3:
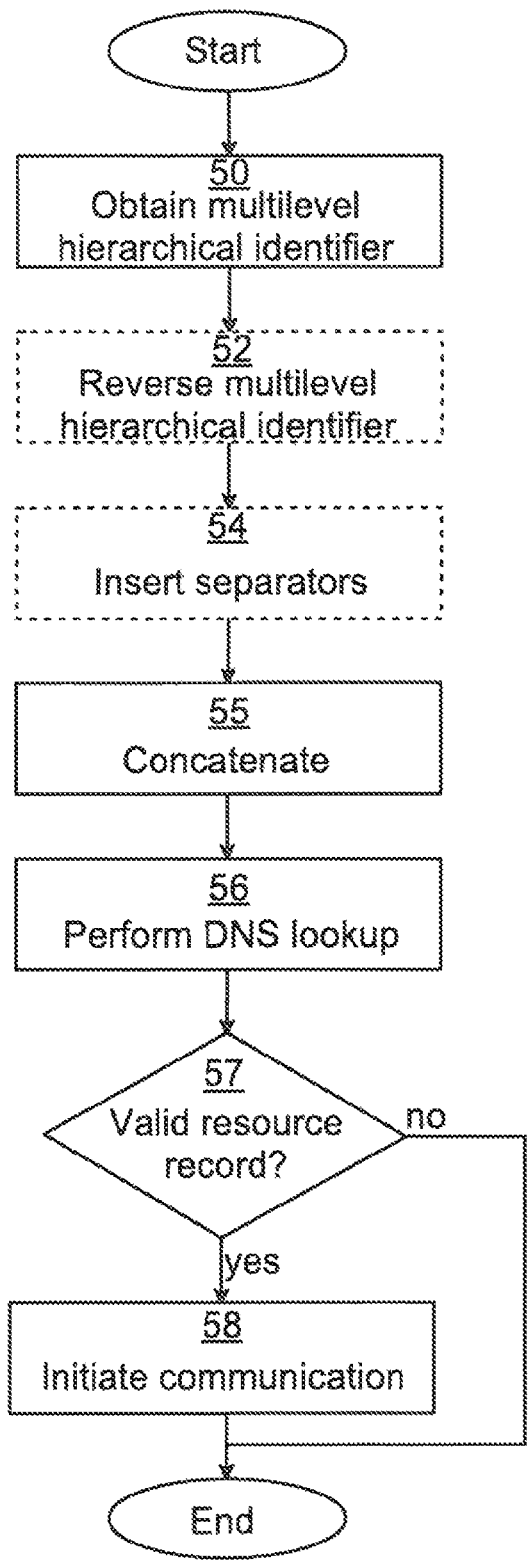
FIG. 3 is a flow chart illustrating an embodiment of a method implemented in the service access apparatus of FIGS. 2a and 2b.

FIG. 3 is a flow chart illustrating an embodiment of a method implemented in the service access apparatus of FIGS. 2a and 2b to selectively initiate communication with the network node 18. The steps of the method essentially correspond to the functional modules of the service access apparatus 10.

In an obtain multilevel hierarchical identifier step 50, a multilevel hierarchical identifier associated with the user 14 is obtained. The multilevel hierarchical identifier can for example be an IP address, a domain name (such as a domain part of an e-mail address of the user) or a phone number. This information can be obtained e.g. from a request from the user device or from data accessible by the user logging in to an application of the service access apparatus 10.

In a reverse multilevel hierarchical identifier step 52, as explained with reference to the data obtainer 30 above, the multilevel hierarchical identifier is reversed, when required, to ensure that the multilevel hierarchical identifier is structured from a lowest (most detailed) level first to a highest (most general) level last.

In an optional insert separators step 54, separators can be inserted between levels of the hierarchical identifier. E.g. when the multilevel hierarchical identifier is a phone number of "4681234567", it has previously been reversed to "7654321864". In this step, separators, such as periods, are inserted between the levels, providing a multilevel hierarchical identifier such as "7.6.5.4.3.2.1.8.6.4"

In a concatenate step 55 the multilevel hierarchical identifier and the domain name of the network node 18 are concatenated. For example, if the multilevel hierarchical identifier is an IP address (previously reversed to ensure lowest level first) of "d.c.b.a" and the domain name for the network node 18 is "foo.bar.com", then this step concatenates the two to a combined domain name of "d.c.b.a.foo.bar.com". It is to be noted that an intermediate period can be inserted between the two parts of the concatenation.

In a perform a DNS lookup step 56, a DNS lookup is performed using the combined domain name and a response of the domain name lookup is received from the DNS 20.

In a conditional valid resource record step 57, it is determined whether the response from the DNS 20 comprises a valid resource record or not. If a valid resource record is comprised in the response, the method continues to an initiate communication step 58. Otherwise, the method ends.

In the initiate communication step 58, the service access apparatus 10 initiates communication with the network node 18 using a pointer included valid resource record received in the perform DNS lookup step 56.

The method can be executed, referring to FIG. 2b, by software instructions in the controller 40, the software instructions being stored in the computer program product 42.

Figure 4A:
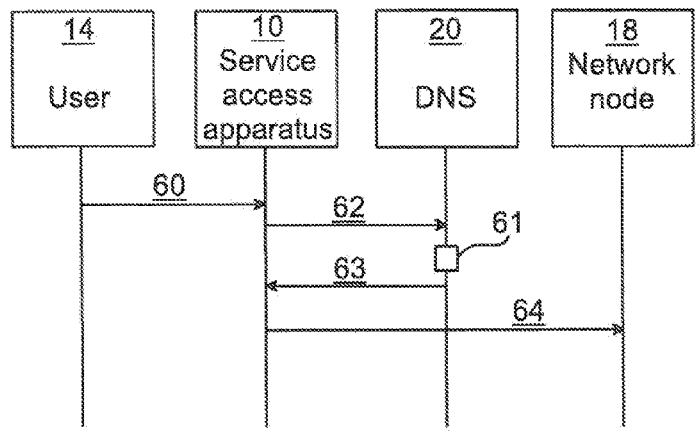
FIGS. 4a-4c are sequence diagrams illustrating communication in embodiments of the present invention.
Figure 4B:
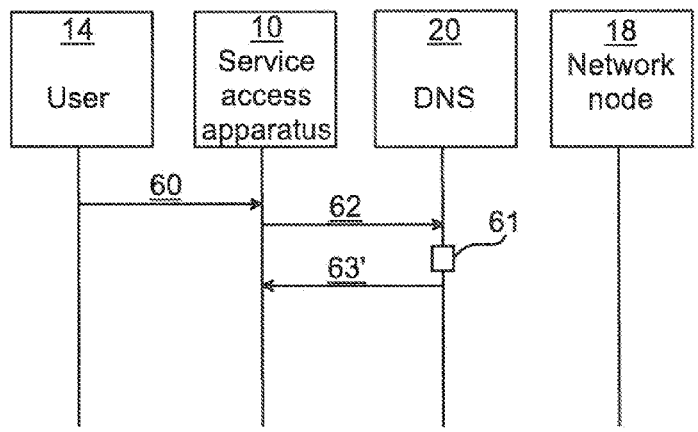
Figure 4C:
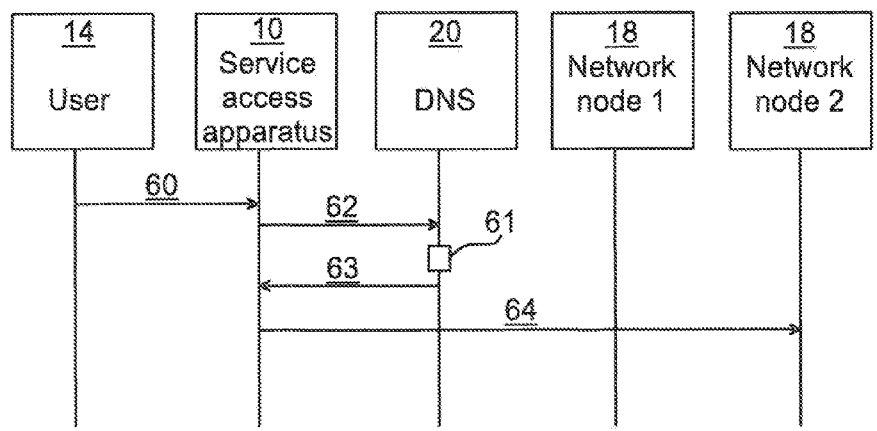

FIGS. 4a-4c are sequence diagrams illustrating communication in embodiments of the present invention. FIGS. 4a and 4b illustrate an embodiment used to selectively prevent requests to the network node 18. FIG. 4c illustrates an embodiment used to direct traffic to an appropriate network node.

In FIG. 4a, the user 14 accesses 60 the service access apparatus 10, either directly as illustrated in FIG. 1b or using a user device 12 as illustrated in FIG. 1a. The service access apparatus 10 performs a DNS lookup 62 using the combined domain name (as explained above) to find a pointer to the network node 18 in a resource record.

The DNS 20 processes 61 the request and returns a response 63 to the service access apparatus, where the response 63 in this case comprises a valid resource record with a pointer to the network node 18.

The service access apparatus can then access 64 the network node 18 to access the desired service.

In FIG. 4b, communication 60 and 62 is the same as for FIG. 4a. Here, however, in the processing 61 of the DNS 20, the DNS 20 matches the combined domain name with an entry which has been agreed to indicate an invalid resource record (or does not find a match). Hence, the DNS sends a response 63' to the service access apparatus 10 comprising the invalid resource record (or no match information). Note, however, that as far as the DNS 20 is concerned, it just performs a lookup as usual; it is only the content of the matching resource record that has previously been agreed to be interpreted as an invalid resource record.

As an example illustrating the cases of FIGS. 4a and 4b, consider a situation where the user 14 uses a user device 12 logs on to a social network like LinkedIn, where LinkedIn here comprises the service access apparatus 10. Let us assume that LinkedIn integrates with Sametime, which here comprises network node 18. Sametime is a service available only for users with e-mail addresses of companies which have registered with Sametime. In other words, the domain part of the e-mail address has to match a registration in Sametime to be able to use the Sametime service. To allow integration, Sametime, i.e. the network node 18, displays a log in box integrated in the LinkedIn web page to allow presentation of combined content to the user 14. In this example, the log in box is referenced using a URL "service.sametime.com". To prevent unnecessary traffic, the Sametime box would only need to be displayed when the LinkedIn user has an e-mail address with a domain that corresponds to a company registration in Sametime. Using the embodiment here, Sametime then adds DNS resource records, corresponding to the combined domain name, to only allow access to e.g. service.sametime.com for users of registered domains. See for example of DNS resource records for Ericsson and Nokia registrations in Table 1:

TABLE 1

DNS entries for prevention of unnecessary communication

| ericsson.com.service.sametime.com | A 1.2.3.4 |
| nokia.com.service.sametime.com | A 1.2.3.4 |

For purpose of illustration, let us assume that there are no other resource records for "service.sametime.com" or any subdomains thereof.

When the user 14 is logged in to LinkedIn on the service access apparatus 10, LinkedIn uses the domain part of the e-mail address of the user and concatenates this with the domain name of the network node 18.

For FIG. 4a and a user with an e-mail address of john.doe@ericsson.com, the service access apparatus 10 thus concatenates "ericsson.com" and "service.sametime.com", with a period between, yielding a combined domain name of "ericsson.com.service.sametime.com". The DNS thus finds a matching resource record and provides this to the service access apparatus 10. Consequently, LinkedIn can then include the box in the LinkedIn web page.

For FIG. 4b and a user with an e-mail address of jane.doe@foo.com, the service access apparatus 10 thus concatenates "foo.com" and "service.sametime.com", with a period between, yielding a combined domain name of "foo.com.service.sametime.cm". The DNS thus does not find a valid resource record to provide to the service access apparatus 10. Consequently, LinkedIn can not include the box in the LinkedIn web page since LinkedIn can not find a valid resource record for "foo.com.service.sametime.cm". One advantage of this solution is that Sametime is not even sent any request, which reduces traffic to the network node 18.

For FIG. 4c, the scenario is similar in the communication of FIG. 4a. However, for this case, consider a situation where the service access apparatus 10 is a web service which accesses a service to look up subscriber data from one of two mobile broadband operators, represented by two network nodes 18, where the mobile broadband operator should match one the current user is currently connected to. Consider the following DNS resource records where, for this example, the resource records below are all resource records for "*.subscrinfo.foo.com". The entries are configured such that each operator (corresponding to network node 2 and network node 1, respectively) is connected to IP addresses within its assigned range.

TABLE 2

DNS entries for service routing

| *.7.6.5.subscrinfo.foo.com | A 5.6.1.1; | network node 2 |
| *.20.19.18.subscrinfo.foo.com | A 18.19.1.1; | network node 1 |

The service access apparatus 10 does not know which operator to contact upon initial user access. Instead, the service access apparatus 10 generates a combined domain name using a reverse IP address of the user device 12 and the domain name of the service, e.g. "subscrinfo.foo.com" and performs a DNS lookup to be able to contact the matching operator. So if the IP address of the user device 12 is "5.6.7.8", the service access apparatus 10 creates a combined domain name of "8.7.6.5.subscrinfo.foo.com". The DNS will match this to give a pointer of "5.6.1.1" and the service access apparatus 10 thus contacts the correct network node 2 to obtain subscriber data. It is also to be noted that any other IP addresses of users, resulting in no matches in the DNS table generates no traffic to either of network node 1 or network node 2.

Figure 5:
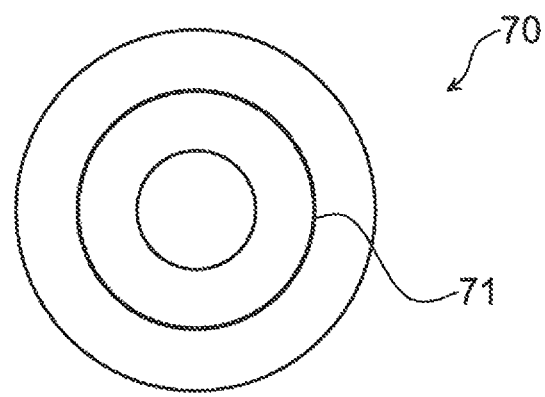
FIG. 5 shows one example of a computer program product comprising computer readable mean.

FIG. 5 shows one example of a computer program product 70 comprising computer readable means. On this computer readable means a computer program 71 can be stored, which computer program can cause a controller to execute a method according to embodiments described herein. In this example, the computer program product is an optical disc, such as a CD (compact disc) or a DVD (digital versatile disc) or a Blu-Ray disc. As explained above, the computer program product could also be embodied as a memory of a device, such as memory 42 of the service access apparatus 10. While the computer program 71 is here schematically shown as a track on the depicted optical disk, the computer program can be stored in any way which is suitable for the computer program product.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A service access apparatus configured to selectively initiate communication with a network node providing a service, the service access apparatus comprising:
   one or more processing circuits configured to function as:
      a data obtainer configured to:
         obtain a multilevel hierarchical identifier associated with a user of the service access apparatus, wherein the multilevel hierarchical identifier is structured between a higher level and a lower level;

in response to the multilevel hierarchical identifier not being structured with the lower level first, reverse the multilevel hierarchical identifier such that the multilevel hierarchical identifier is structured with the lower level first;

a concatenator configured to determine a combined domain name by concatenating the multilevel hierarchical identifier and a domain name of the network node;

a domain name lookup client configured to:
perform a domain name lookup using the combined domain name;
receive a response of the domain name lookup; and a communication initiator configured to initiate, in response to the response to the domain name lookup comprising a valid resource record for the network node, communication with the network node using a node pointer in the resource record.

2. The service access apparatus of claim 1, wherein the communication initiator is further configured to refrain, in response to the response to the domain name lookup failing to comprise a valid resource record for the network node, from initiating communication with the network node.

3. The service access apparatus of claim 1, wherein the data obtainer is configured to, in response to the multilevel hierarchical identifier not being structured with separators between levels, insert at least one separator between levels of the multilevel hierarchical identifier.

4. The service access apparatus of claim 1, wherein the service access apparatus is configured to allow remote access by the user.

5. The service access apparatus of claim 1, wherein the service access apparatus acts as a server for a user device.

6. The service access apparatus of claim 5, wherein the multilevel hierarchical identifier is an IP address of the user device.

7. The service access apparatus of claim 1, wherein the multilevel hierarchical identifier is a domain part of an e-mail address of the user.

8. The service access apparatus of claim 1, wherein the multilevel hierarchical identifier is a phone number associated with the user.

9. A method, performed in a service access apparatus, to selectively initiate communication with a network node providing a service, the method comprising:
obtaining a multilevel hierarchical identifier associated with a user of the service access apparatus, wherein the multilevel hierarchical identifier is structured between a higher level and a lower level;

in response to the multilevel hierarchical identifier not being structured with the lower level first, reversing the multilevel hierarchical identifier such that the multilevel hierarchical identifier is structured with the lower level first;

concatenating the multilevel hierarchical identifier and a domain name of the network node to provide a combined domain name;

performing a domain name lookup using the combined domain name;

receiving a response to the domain name lookup;

in response to the response to the domain name lookup comprising a valid resource record for the network node, initiating communication with the network node using a node pointer in the resource record.

10. The method of claim 9, further comprising: in response to the response to the domain name lookup failing to comprise a valid resource record for the network node, refraining from initiating communication with the network node.

11. The method of claim 9, further comprising: in response to the multilevel hierarchical identifier not being structured with separators between levels, inserting at least one separator between levels of the multilevel hierarchical identifier.

12. A computer program product stored in a non-transitory computer readable medium for selectively initiating communication of a service access apparatus with a network node providing a service, the computer program product comprising software instructions which, when run on one or more processing circuits of the service access apparatus, causes the service access apparatus to:
obtain a multilevel hierarchical identifier associated with a user of the service access apparatus, wherein the multilevel hierarchical identifier is structured between a higher level and a lower level;

in response to the multilevel hierarchical identifier not being structured with the lower level first, reverse the multilevel hierarchical identifier such that the multilevel hierarchical identifier is structured with the lower level first;

concatenate the multilevel hierarchical identifier and a domain name of the network node to provide a combined domain name;

perform a domain name lookup using the combined domain name; receive a response of the domain name lookup;

in response to the response to the domain name lookup comprising a valid resource record for the network node, initiate communication with the network node using a node pointer in the resource record.

\* \* \* \* \*